US009893941B1

(12) United States Patent
Balasubramanian et al.

(10) Patent No.: US 9,893,941 B1
(45) Date of Patent: Feb. 13, 2018

(54) UNIT SOURCING

(71) Applicant: QUALCOMM Incorporated, San Diego, CA (US)

(72) Inventors: Srinivasan Balasubramanian, San Diego, CA (US); Kirankumar Bhoja Anchan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/649,103

(22) Filed: Jul. 13, 2017

Related U.S. Application Data

(60) Provisional application No. 62/368,772, filed on Jul. 29, 2016.

(51) Int. Cl.
*H04B 17/21* (2015.01)
*H04L 12/24* (2006.01)
*H04W 8/24* (2009.01)

(52) U.S. Cl.
CPC ........ *H04L 41/0823* (2013.01); *H04L 41/085* (2013.01); *H04W 8/24* (2013.01)

(58) Field of Classification Search
None
See application file for complete search history.

(56) References Cited

U.S. PATENT DOCUMENTS

| 8,787,855 | B2 | 7/2014 | Rousu et al. |
| 9,374,727 | B2 * | 6/2016 | Dural .................... H04W 24/10 |
| 9,444,692 | B2 * | 9/2016 | Lehane ............... H04L 41/0816 |
| 9,449,115 | B2 | 9/2016 | Hu et al. |
| 2014/0328190 | A1 | 11/2014 | Lord et al. |
| 2015/0189556 | A1 | 7/2015 | Sidhu et al. |
| 2016/0182558 | A1 | 6/2016 | Tripp |
| 2016/0196497 | A1 | 7/2016 | Allen et al. |
| 2016/0330223 | A1 * | 11/2016 | Sridhara ............. H04L 63/1425 |

FOREIGN PATENT DOCUMENTS

EP    2 903 387 A1    8/2015

OTHER PUBLICATIONS

International Search Report and Written Opinion—PCT/US2017/042103—ISA/EPO—dated Oct. 9, 2017. 13 pages.

* cited by examiner

*Primary Examiner* — David Bilodeau
(74) *Attorney, Agent, or Firm* — Arent Fox, LLP

(57) ABSTRACT

A method for wireless communication, for example, accessing a wireless network via a network access node and determining whether the network access node is a frequented node or a non-frequented node based on an identifier for the network access node is provided. The method executes a modem function using a corresponding selected hypothesis having associated weights for each feature associated with the modem function, and being a unit sourced hypothesis or a crowd sourced hypothesis, each hypothesis corresponding to a modem function and including a plurality of features, state information and at least one trigger point. The method sends information, to a server, the information comprising a device identifier identifying the UE, the modem function, the selected hypothesis and associated weights, metrics for each feature and state information, if state information is available, in response to a trigger point being met when executing the modem function. Other aspects are provided.

30 Claims, 10 Drawing Sheets

UNIT SOURCING

CLAIM OF PRIORITY UNDER 35 U.S.C. §119

The present application for patent claims priority to Provisional Patent Application No. 62/368,772, entitled "Unit Sourcing" filed Jul. 29, 2016, which is assigned to the assignee hereof and hereby expressly incorporated by reference herein for all purposes.

BACKGROUND

Field

The present disclosure relates generally to communication systems, and more particularly, to methods and apparatus for post deployment tuning of a user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology.

Prior to deployment of UEs, algorithms are built into the modems, however such algorithms are inherently rigid. The algorithms typically use only weighted linear averaging of parameters with the parameters and weights being fixed and not adaptable. The parameters and weights are determined based on data collected in labs and based on minimal field studies. The parameters and weights are conservatively tuned to support all devices and all markets. For example, the device specific configurations, capability and performance, such as antenna configuration, is not taken into consideration for tuning purposes. Performance variations of the UEs can vary based on the different regions of the network and the specific experience that the UE encounters traversing these networks. Typically, the modem is tuned once. The tuning does not consider the current active set of services in the choice of the algorithm behavior. As such, there is a demand for post deployment tuning of the modem algorithms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes accessing a wireless network via a network access node; determining whether the network access node is a frequented node or a non-frequented node based on an identifier for the network access node; executing a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and sending information, to a server, the information comprising a device identifier identifying the UE, the modem function, the selected hypothesis and associated weights, metrics for each feature and state information, if the state information is available, in response to a trigger point being met when executing the modem function.

The method may also include sending, to the server, a modem algorithm identifier identifying a version of the set of hypotheses stored on the UE. The method may further include sending, to the server, a subset of hypotheses that the UE can use wherein the subset contains less hypotheses than the set of hypotheses stored on the UE. The method may further include sending, to the server, a time indicator that the server can store information received from the UE. The method may further include receiving, from the server, a selected unit sourced hypothesis and a selected crowd sourced hypothesis, with each selection corresponding to a modem function and including weights for each feature associated with the modem function, wherein the selected unit sourced hypothesis is based on information the UE sent to the server and the information being run through one or more learning algorithms and the selected crowd sourced hypothesis based on crowd sourced data. The UE may select the unit sourced hypothesis when the network access node is a frequented node based on an identifier for the network access node and the crowd sourced hypothesis when the network access node is a non-frequented node based on an identifier for the network access node.

In another aspect, a method for wireless communications is provided. The method includes receiving information, at a server from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function; storing, by the server, the received information; running, by the server, one or more learning algorithms based on the stored information to cluster the information and to select a unit sourced hypothesis and associated weights for the corresponding modem function when the UE provided the state information; running, by the server, one or more learning algorithms based on crowd sourced information from other UEs to cluster the information and to select a unit sourced hypothesis and associated weights for the corresponding modem function when the state information was not provided by the UE; selecting, by the server, the unit sourced hypothesis and associated weights based on the one or more learning algorithms; running, by the server, one or more learning algorithms based on crowd sourced information from other UEs to cluster the information and to select a crowd sourced hypothesis and associated weights for the corresponding modem function when the state information was provided by the UE; selecting, by the server, the crowd sourced hypothesis and associated weights based on the one or more learning algorithms; and sending, by the server to the UE, at least one of the selected unit sourced hypothesis and associated weights or the selected crowd sourced hypothesis and associated weights for the corresponding modem function.

The method may also include receiving by the server from the UE, a modem algorithm identifier indicating a version of a set of hypotheses stored on the UE and the selected unit sourced hypothesis and the selected unit sourced hypothesis are selected from the set of hypotheses stored on the UE. The method may further include receiving by the server from the UE, a subset of hypotheses that the UE can use and the and the selected unit sourced hypothesis and the selected unit sourced hypothesis are selected from the subset of hypotheses stored on the UE, where the subset is less than a set of hypotheses stored on the UE. The method may further include employing neural networks and sending neural networks information for applying a selected hypothesis. The method may further include receiving, by the server from the UE, a time indicator that the server can store information received from the UE when the UE used a selected unit sourcing hypothesis. The method may further include sending, by the server to the UE, state information associated with a selected unit sourced hypothesis when the server ran one or more learning algorithms based on crowd sourced information when the state information was not provided by the UE. The method may further include sending, by the server to the UE, at least one of state information associated with a selected unit sourced hypothesis and state information associated with a selected crowd sourced hypothesis.

In another example, an apparatus for wireless communications is provided. The apparatus includes a transceiver, a memory configured to store instructions and one or more processors communicatively couple with the transceiver and the memory. The one or more processors are configure to execute instructions to: access a wireless network via a network access node; determine whether the network access node is a frequented node or a non-frequented node based on an identifier for the network access node; execute a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and send information, to a server, the information comprising a device identifier identifying the UE, the modem function, the selected hypothesis and associated weights, metrics for each feature and state information, if the state information is available, in response to a trigger point being met when executing the modem function.

In another example, a server for wireless communications is provided. The server includes a transceiver, a memory configured to store instructions and one or more processors communicatively couple with the transceiver and the memory. The one or more processors are configure to execute instructions to: receive information, at the server from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function; store, by the server, the received information; run, by the server, one or more learning algorithms based on the stored information to cluster the information and to select a unit sourced hypothesis and associated weights for the corresponding modem function when the UE provided the state information; run, by the server, one or more learning algorithms based on crowd sourced information from other UEs to cluster the information and to select a unit sourced hypothesis and associated weights for the corresponding modem function when the state information was not provided by the UE; select, by the server, the unit sourced hypothesis and associated weights based on the one or more learning algorithms; run, by the server, one or more learning algorithms based on crowd sourced information from other UEs to cluster the information and to select a crowd sourced hypothesis and associated weights for the corresponding modem function when the state information was provided by the UE; select by the server, the crowd sourced hypothesis and associated weights based on the one or more learning algorithms; and send, by the server to the UE, at least one of the selected unit sourced hypothesis and associated weights or the selected crowd sourced hypothesis and associated weights for the corresponding modem function.

In another example, a user equipment (UE) for wireless communications is provided. The UE includes means for accessing a wireless network via a network access node; means for determining whether the network access node is a frequented node or a non-frequented node based on an identifier for the network access node; means for executing a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and means for sending information, to a server, the information comprising a device identifier identifying the UE, the modem function, the selected hypothesis and associated weights, metrics for each feature and state information, if the state information is available, in response to a trigger point being met when executing the modem function.

In another example, a server for wireless communications is provided. The server includes means for receiving information, at a server from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function; means for storing, by the server, the received information; means for running, by the server, one or more learning algorithms based on the stored information to cluster the information and to select a unit sourced hypothesis and associated weights for the corresponding modem function when the UE provided the state information; means for running, by the server, one or more learning algorithms based on crowd sourced information from other UEs to cluster the information and to select a unit sourced hypothesis and associated weights for the corresponding modem function when the state information was not provided by the UE; means for selecting, by the server, the unit sourced hypothesis and associated weights based on the one or more learning algorithms; means for running, by the server, one or more learning algorithms based on crowd sourced information from other UEs to cluster the information and to select a crowd sourced hypothesis and associated weights for the corresponding modem function when the state information was provided by the UE; means for selecting, by the server, the crowd sourced hypothesis and associated weights based on the one or more learning algorithms; and means for sending, by the server to the UE, at least one of the selected unit sourced hypothesis and associated weights or the selected crowd sourced hypothesis and associated weights for the corresponding modem function.

In a further example, a non-transitory computer-readable medium storing executable code is provided. The code include code for accessing a wireless network via a network access node; code for determining whether the network access node is a frequented node or a non-frequented node based on an identifier for the network access node; code for executing a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and code for sending information, to a server, the information comprising a device identifier identifying the UE, the modem function, the selected hypothesis and associated weights, metrics for each feature and state information, if the state information is available, in response to a trigger point being met when executing the modem function.

In another example, a non-transitory computer-readable medium storing executable code is provided. The code include code for receiving information, at a server from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function; code for storing, by the server, the received information; code for running, by the server, one or more learning algorithms based on the stored information to cluster the information and to select a unit sourced hypothesis and associated weights for the corresponding modem function when the UE provided the state information; code for running, by the server, one or more learning algorithms based on crowd sourced information from other UEs to cluster the information and to select a unit sourced hypothesis and associated weights for the corresponding modem function when the state information was not provided by the UE; code for selecting, by the server, the unit sourced hypothesis and associated weights based on the one or more learning algorithms; code for running, by the server, one or more learning algorithms based on crowd sourced information from other UEs to cluster the information and to select a crowd sourced hypothesis and associated weights for the corresponding modem function when the state information was provided by the UE; code for selecting, by the server, the crowd sourced hypothesis and associated weights based on the one or more learning algorithms; and code for sending, by the server to the UE, at least one of the selected unit sourced hypothesis and associated weights or the selected crowd sourced hypothesis and associated weights for the corresponding modem function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
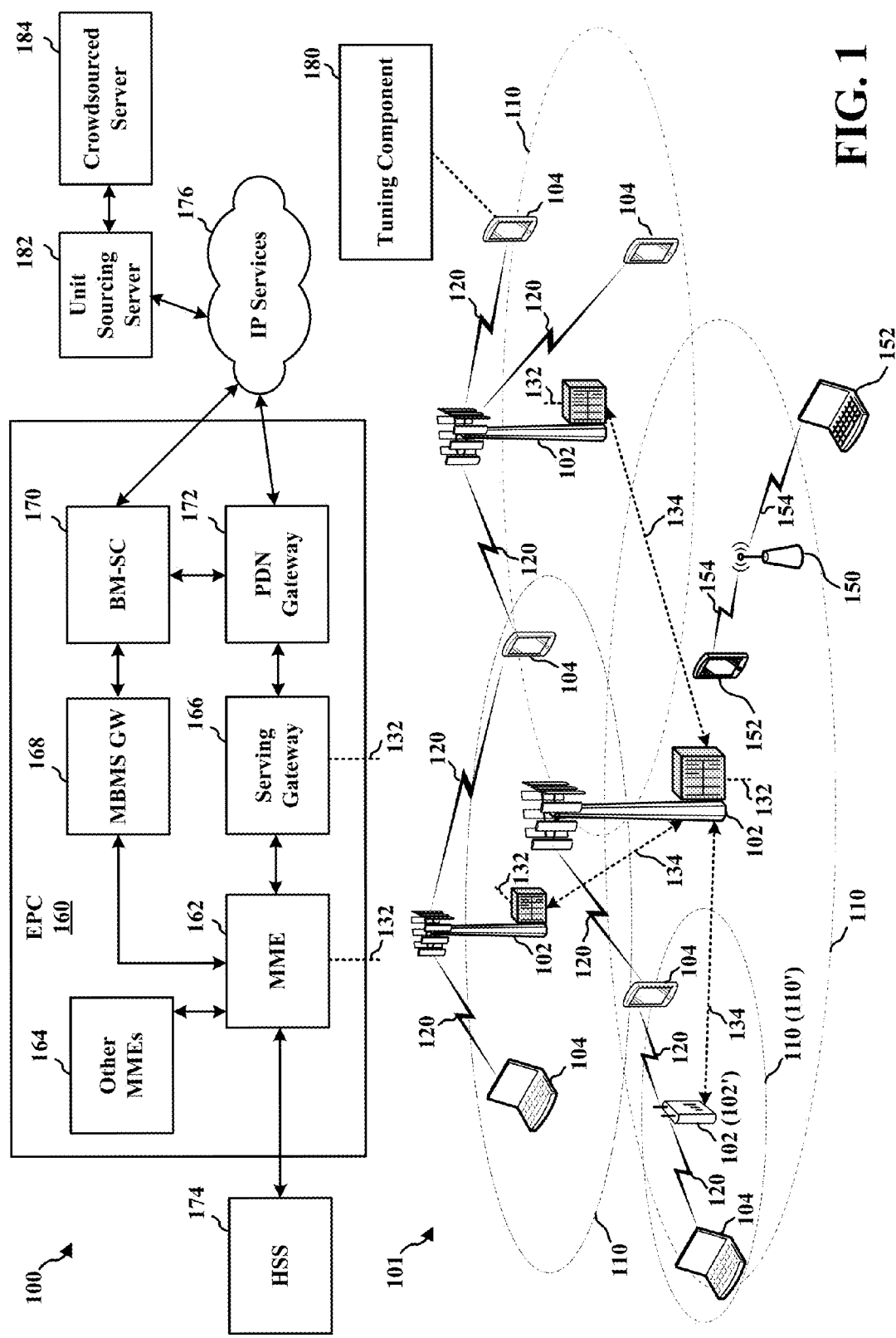
FIG. 1 is a diagram illustrating an example of a wireless communications system and an access network.

This disclosure generally relates to tuning a modem residing in a user equipment (UE) using a tuning component in the UE in conjunction with a unit sourcing server (USS), after deployment of the UE.

In one high-level aspect, a modem of a UE can be tuned, post deployment, by a USS in conjunction with a tuning component on the UE. By tuning the modem, the UE is able to improve the performance of the modem by improving or optimizing one or more algorithms that are stored on the UE. The algorithms are used to perform modem functions on the UE. For example, the algorithm for deciding when to switch from WiFi to LTE can be tuned to improve the timing of the switch from WiFi to LTE so that a user of the UE does not experience poor quality prior to the switch. To do so, a selected hypothesis having associated weights is employed when a modem algorithm is executing a corresponding modem function. The hypothesis is selected from a set of hypotheses that are stored on the UE. The hypothesis is an equation that has features and weights. The features are values associated with a modem function, such as WiFi Received Signal Strength Indicator (RSSI) or UpLink (UL) packet loss. The weights adjusts the values of the features.

To select a hypothesis and the associated weights, information is gathered from the UE. The UE is able to gather information and improve the "behavior" of the modem algorithms directly associated with the environment experienced by the UE. In response to a triggering point, the tuning component can send information associated with features for the executed modem function to the USS. The trigger point is used to gather metrics of features at a given time, e.g., a snapshot of the values of the features at the time. The trigger point can be when a determination is made to perform a modem function (e.g., switch from WiFi to LTE) or not to perform the modem function (e.g., not to switch from WiFi to LTE). By using the USS to store and process the data, the UE is able to reduce or minimize using the memory and processor of the UE.

The USS runs one or more learning algorithms using the information received from the UE and/or using crowd sourced information The USS runs the one or more learning algorithms to select a unit sourced hypothesis and associated weights and a crowd sourced hypothesis and associated weights. The selected unit sourced hypothesis can be employed when the UE connects to a wireless network via a network access point that the UE has used in a given time period. The selected crowd sourced hypothesis can be employed when the UE connects to the wireless network via a network access point that the UE has not used in the given time period. The UE employs the selected hypothesis and the associated weights when a corresponding modem function is executed.

Such an approach combines the use of cloud computing and machine learning to tune the behavior of a UE modem on an individual UE basis. Although the information/data sent from the UE to the USS can be used for crowd sourcing, the approach allows for unit sourcing so the modem algorithms can be fine-tuned based on the network experiences of the particular UE. Such an approach avoids the conservative modem configurations that are utilized in conventional approaches. Rather, the modem can be tuned based on data obtained by a given UE for frequented routes and can be tuned based on crowd sourced data when the UE travels outside of the frequented routes. In some implementations, the UE can employ or run both a selected unit sourced hypothesis and a selected crowd sourced hypothesis with the UE arbitrating across both to determine which hypothesis provides the better result. By using such an approach, the modem can be tuned where the relevant parameters and relative association in terms of determining trigger points is not well understood prior to deployment. Thus, the parameters can be tuned post deployment and can allow for more parameters to be included in making the hypotheses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system 100, including one or more user equipments (UEs) 104 with each UE 104 having a tuning component 180, a unit sourcing server 182 and a crowd sourcing server 184. The tuning component 180 and unit sourcing server 182 are configured to tune a modem on a UE 104 after the UE 104 is deployed, e.g., post deployment. The crowd sourcing server 184 can be used to assist in the tuning of the UE 104. The details of the operation and architecture associated with the tuning component 180 are discussed in more detail below with respect to FIGS. 4-8. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., where Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) or Listen Before Talk (LBT) functionality prior to communicating in order to determine whether the channel is available (e.g., generally, to avoid transmitting on a channel where another transmission is occurring, which would cause interference).

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

Base stations 102, UEs 104, APs 150, and STAs 152 may also operate in one or more shared frequency bands, such as according to General Authorized Access (GAA) in the 3.5 GHz band.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
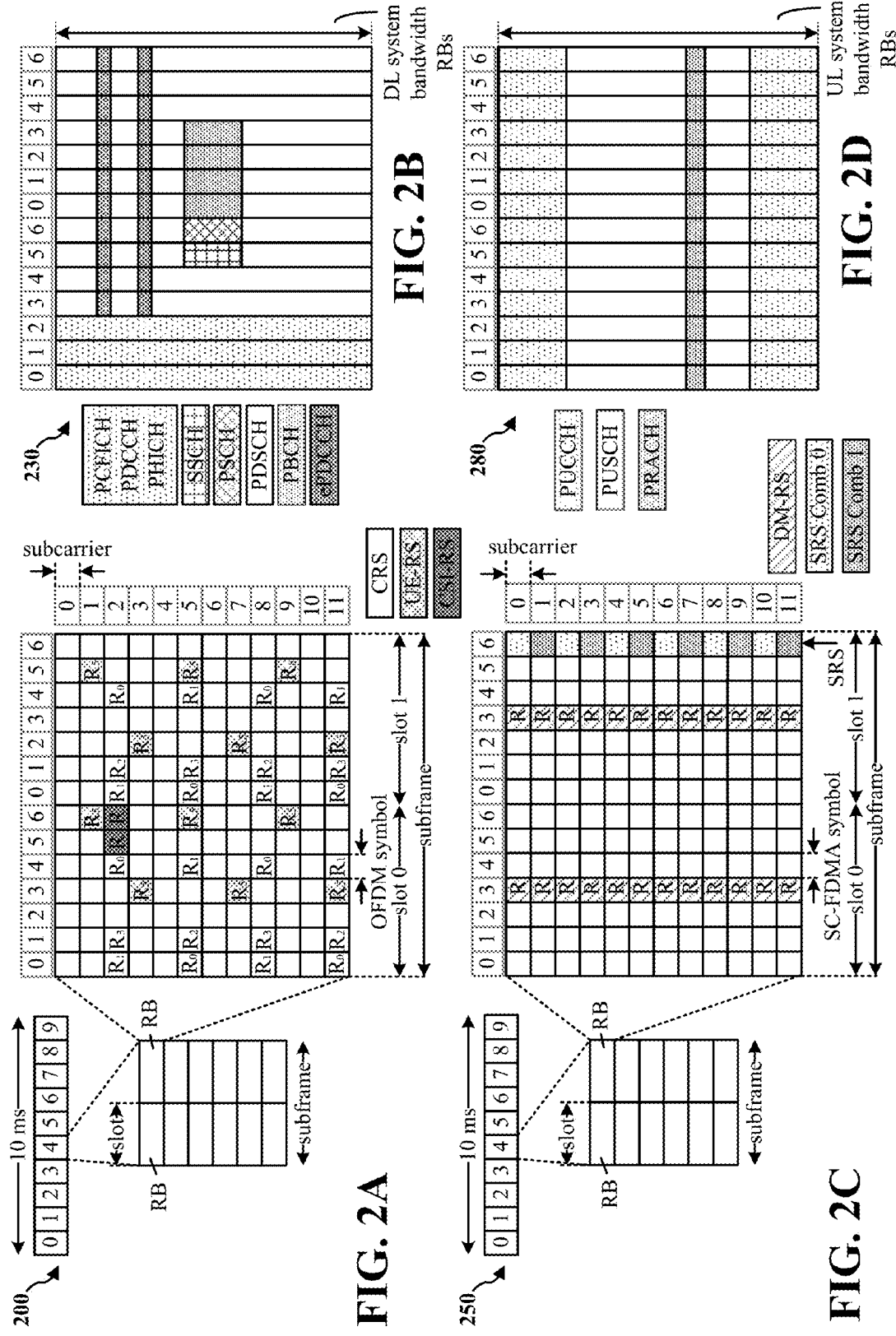
FIG. 2A is a diagram illustrating an example of a DL frame structure in LTE.
FIG. 2B is a diagram illustrating an example of DL channels within the DL frame structure in LTE.
FIG. 2C is a diagram illustrating an example of an UL frame structure in LTE.
FIG. 2D is a diagram illustrating an example of UL channels within the UL frame structure in LTE.

FIG. 2A is a diagram 200 illustrating an example of a DL frame structure in LTE, which may be utilized for communications between the wireless communication devices of FIG. 1, e.g., by one or more of base stations 102 or 102', UEs 104, APs 150, and/or STAs 152. FIG. 2B is a diagram 230 illustrating an example of channels within the DL frame structure in LTE, which may be utilized for communications between the wireless communication devices of FIG. 1. FIG. 2C is a diagram 250 illustrating an example of an UL frame structure in LTE, which may be utilized for communications between the wireless communication devices of FIG. 1. FIG. 2D is a diagram 280 illustrating an example of channels within the UL frame structure in LTE, which may be utilized for communications between the wireless communication devices of FIG. 1. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
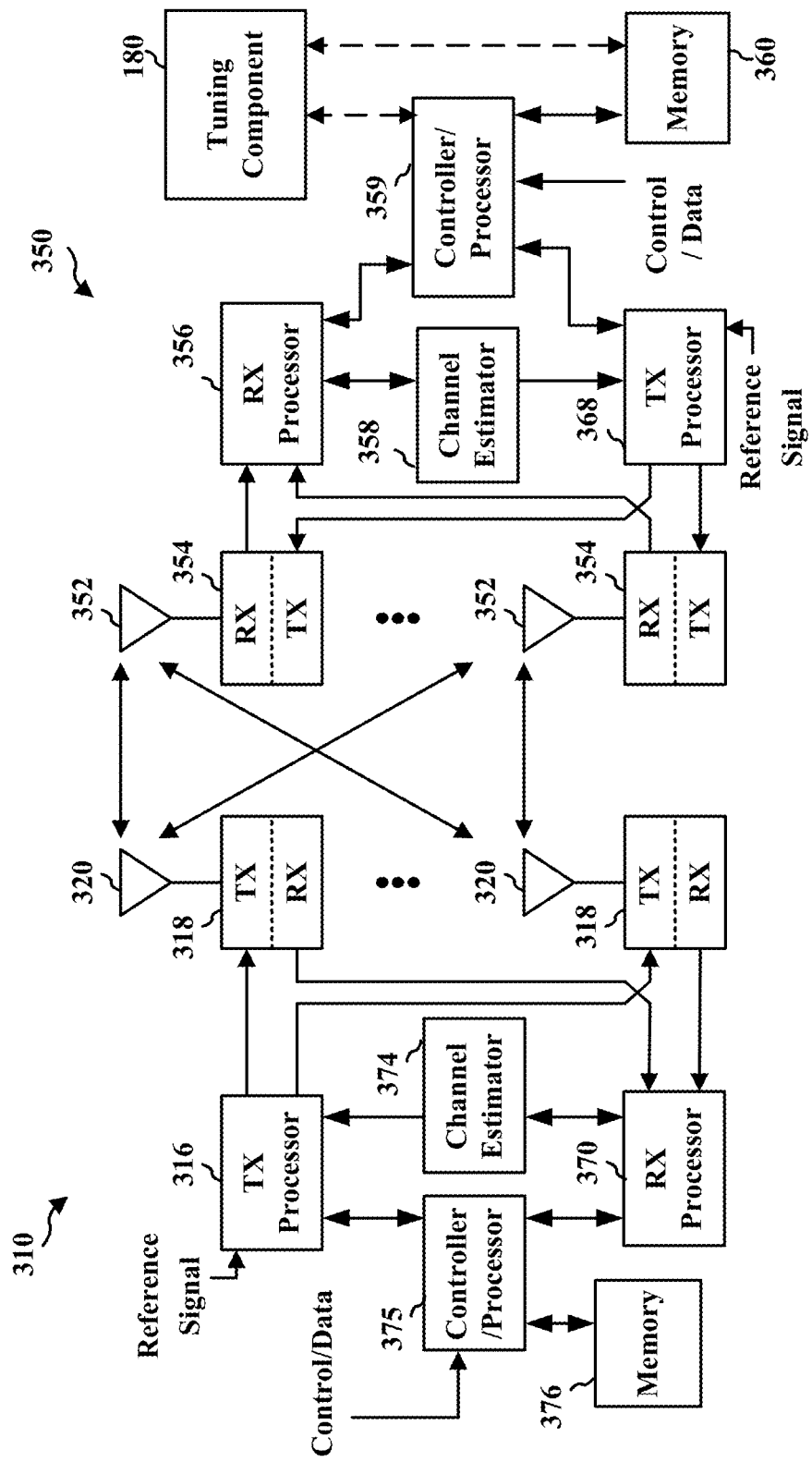
FIG. 3 is a diagram illustrating an example of an evolved Node B (eNB) and user equipment (UE) in an access network.

FIG. 3 is a block diagram of an eNB 310 in communication with a UE 350 in an access network, where the eNB 310 may be an example of base stations 102 or 102' and/or APs 150 of FIG. 1, and wherein the UE 350 may be an example of UEs 104 and/or STAs 152 of FIG. 1. In an aspect, the tuning component 180 may be part of the UE 350, such as implemented within controller/processor 359 and/or memory 360. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by a channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
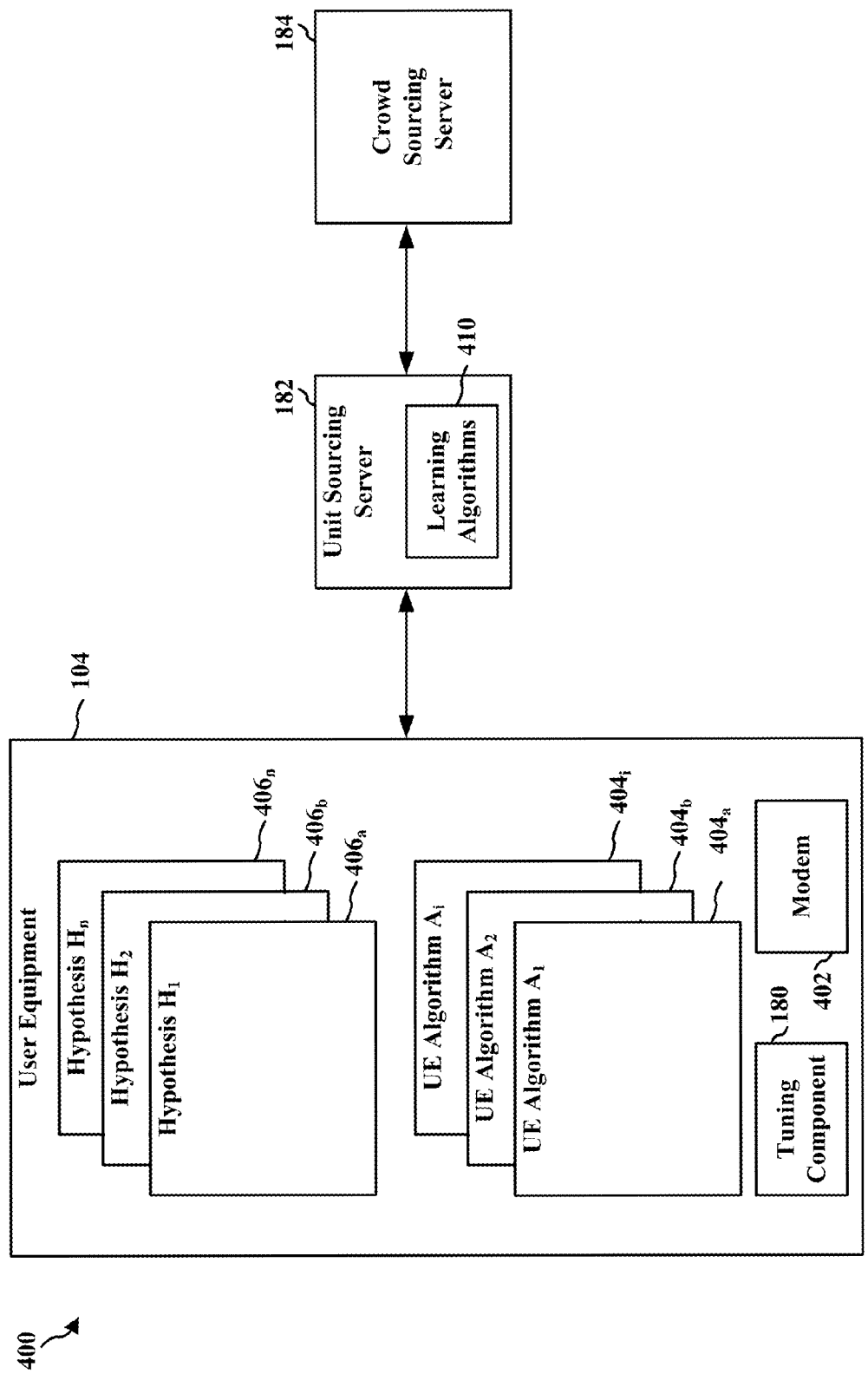
FIG. 4 is schematic diagram of a network architecture according to one or more described aspects.

Referring to FIG. 4, a wireless communications system 400, which may be similar to wireless communications system 100 of FIG. 1, may include additional system components in one exemplary implementation for tuning a modem 402 of a UE 104 using the tuning component 180 in conjunction with the USS 182.

In particular, wireless communications system 400 includes a UE 104 having a modem 402, a tuning component 180 having a set of modem algorithms 404 and a set of hypotheses 406. The modem 402 is configured to connect the UE 104 to a wireless network, e.g., IP services 176, via an access point, e.g., a base station 102. The modem 402 is configured to send and receive data, e.g., voice and/or data. The tuning component 180 is configured to tune the modem 402 by employing a selected hypothesis from the set of hypotheses 406 that are stored on the UE 104. The selected hypothesis can be a selected unit sourced hypothesis or a selected crowd sourced hypothesis. The selected unit sourced hypothesis can be employed when the UE 104 is connected to a wireless network via a network access point that the UE 104 has used in a given time period. A user of UE 104 can frequently connect to the same network access points based on their routine for a given time period, e.g., weekly or monthly. For example, a user of UE 104 can connect to the same network access point when the user stops for morning coffee and can connect to a different network access point when the user arrives at work. This can be referred to as an UE frequented route. The selected crowd sourced hypothesis can be employed when the UE 104 is connected to the wireless network via a network access point that the UE 104 has not used in the given time period. For example, the selected crowd sourced hypothesis can be employed if a user takes a trip outside of his or her UE frequented route. The UE 104 can use the selected hypothesis having associated weights to execute a corresponding modem function, such as switch from WiFi to LTE. In response to a triggering point the tuning component 180 can send information associated with the features for the executed modem function to the USS 182. For example, the UE 104 sends feature values ($x_1$, $x_2$, . . . , $x_n$) and state information associated with the corresponding modem function, if available, in response to a triggering point or event being met. The feature values and state information is explained below. The state information is an expected outcome. For example, state information can be switch from WiFi to LTE or stay on WiFi.

The USS 182 receives and can archive the received information/data. The USS 182 can run one or more learning algorithms 410 based on the information received from the tuning component 180. As explained in more detail below, the USS 182 can use the received information from the UE 104 and/or use crowd sourced information to select a unit sourced hypothesis and associated weights and a crowd sourced hypothesis and associated weights. The crowd sourced data can be obtained from a crowd sourcing server 184. The crowd sourcing server 184 can include information learned from multiple UEs. As a result, the USS 182 can tune the modem, post deployment, based on information from the UE and/or crowd sourced information.

The UE 104 can include a plurality of modem algorithms 404 with each executing a specific modem function. Each modem algorithm 404 can include a plurality of features ($x_i$) associated with a modem function. For example, the features can be Reference Signal Received Quality (RSRQ), Hybrid Automatic Repeat request (HARQ) $1^{st}$ packet error, Residual HARQ Block Error Rate (BLER), Real-Time Transport Protocol (RTP) PER, RTP end to end (e2e) delay, etc. The features (X) can be combined. For example, a combination of features can be $\{x_1, x_2, x_3, \ldots, x_n\}$. Each feature $x_i$ can be a linear representation, a polynomial representation ($x_i^k$) and/or a product of multiple features ($x_i*x_j$). The modem algorithm 404 can include linear and quadratic forms for all of the features. Each modem algorithm 404 can include one or more expected results ($y_i$) for the executed modem function. The expected results can be a set of output conditions that are considered to be met. The expected results can be referred to as state information which is the state when a modem function is executed. The state information can be optional.

For example, a modem algorithm 404 can be for LTE-WiFi handover (HO) for Voice over LTE (VOLTE). Table I shows the features ($x_i$) and expected results (Y).

TABLE I

| LTE - WiFi handover (HO) for Voice over LTE (VoLTE). | |
|---|---|
| X | |
| $x_1$ | WiFi RSS |
| $x_2$ | MAC retry count |
| $x_3$ | MAC PER |
| $x_4$ | MAC Uplink quality metric |
| $x_5$ | MAC Downlink quality metric |
| $x_6$ | Adaptive dejitter buffer depth |
| $x_7$ | $95^{th}$ Percentile DL Relative jitter |
| $x_8$ | DL Packet loss |
| $x_9$ | Average UL Relative jitter |
| $x_{10}$ | UL Packet loss |
| $x_{11}$ | LTE RSRP |
| $x_{12}$ | LTE RSRQ |
| $x_{13}$ | LTE SINR |
| $x_{14}$ | WiFi Access Point BSSID, corresponding cellular cluster |
| $x_{15}$ | (WiFi RSSI)$^2$ |
| $x_{16}$ | (MAC retry count)$^2$ |
| $x_{17}$ | (MAC PER)$^2$ |
| . . . | |
| $x_n$ | |
| Y | |
| $Y_1$ | HO to LTE |
| $Y_2$ | Remain on WiFi |
| $Y_3$ | CS repoint |

In another example, a modem algorithm 404 can be for Modem Voltage Setting. Table II shows the features ($x_i$) and expected result (Y).

TABLE II

| Modem Voltage Setting | |
|---|---|
| X | |
| $x_1$ | PDSCH PER |
| $x_2$ | RLC error (HARQ residual error) |
| $x_3$ | RSRP/RSRQ |
| . . . | |
| $x_{n'}$ | |
| Y | |
| $Y_1$ | High |
| $Y_2$ | Low |

Tables I and II list the features $x_i$ in linear and quadratic form. Table I shows three expected outcomes (Y) for LTE-WiFi HO for VOLTE: handover to LTE, remain on WiFi and association remains on WiFi but point to circuit switch (CS) for calling purposes. Table II shows two expected outcomes (Y) for Modem Voltage Settings: high and low.

When executing a modem function, the modem 402 and/or tuning component 180 employs a selected hypothesis having associated weights for each feature of the modem algorithm 404. The selected hypothesis is selected from the set of hypothesis 406 stored on the UE 104, e.g., in the memory of the UE 104. Each hypothesis ($h_k(x)$) includes a weighted combination of features $x_i$. The UE 104 is provisioned with multiple possible hypothesis $h_k(x)$ for k=1 to m, where m may be a value up to any number. A hypothesis can be a linear regression, logistic regression or a support vector machine (SVM) with associated weights. For example, a linear regression or SVM hypothesis can be represented by $h_k(x) = \Theta_0 + \Theta_1 x_1 + \Theta_2 x_2 + \Theta_n x_n$, where $\Theta_j$ are the weights applied to each feature. A logistic regression can be represented by $h_k(x)=1/(1\ \exp^{-\Theta 0+1x1+\Theta 2x2+\ldots\Theta nxm})$, where $\Theta_j$ are the weights applied to each feature. A hypothesis can include neural network information associated with the hypothesis for handling hidden layers and applying different techniques for the representations for each layer or regression.

There are two types of hypotheses 406: unit sourced hypotheses and crowd sourced hypotheses. A selected unit sourced hypothesis is used when the UE 104 accesses a frequented access node and a selected crowd sourced hypothesis is used when the UE 104 accesses a non-frequented access node. A frequented access node is an access node that the UE 104 has previously accessed within a given time period. For example, a frequented access node is an access node that the UE 104 accesses in a UE frequented route, such as when the UE user goes to work. A non-frequented access node is an access node the UE 104 has not previously accessed within a given time period. For example, a non-frequented access node is an access node that a UE 104 accesses when going outside the frequented route, such as when the UE user goes on travel.

In an aspect, other criteria can be used to arbitrate across the two selected hypotheses. For example, if the UE 104 has a dual modem, the unit sourced hypothesis can be employed on a first modem and the crowd sourced hypothesis can be employed on a second modem. Alternatively, the modem 402 can switch off between the two selected hypothesis to gather information to determine which selected hypothesis performs better.

At specific trigger points, the UE 104 can send information to the USS 182. The information can include the metrics for the features associated with the executed modem algorithm. The metrics can be real values and/or can be Boolean values. For example, if a metric is for a voltage, the actual voltage can be sent or a Boolean value indicating whether the voltage is above a threshold or below a threshold can be sent. The threshold can be a predetermined value. If state information is available, the state information can be sent as well. The state information can be sent when the UE 104 is able to determine the expected outcome for a given input X. When state information is not provided to the USS 182, the USS 182 treats this information as unclassified and employs unsupervised learning, which uses clustering of the data to classify the data. This mechanism can be combined with crowd sourced information to determine consistent versus anomalous behaviors. The anomalous behavior (e.g., anything outside the identified clusters) can be used as triggering functions as well.

For example, if the modem function is LTE-WiFi HO for VoLTE, the UE 104 would send the metrics for the features ($x_i$) listed in Table 1. In addition, if one of the expected outcomes was reached, e.g., HO to LTE, remain on WiFi or CS repoint, the state information can be sent to the USS 182. The trigger points can be the expected outcomes and/or other trigger points. For example, if a call is dropped, the dropping of the call can be a trigger point. For some modem functions, there may not be an expected outcome.

The information that the UE 104 sends to the USS 182 can include the selected hypothesis, the selected unit sourced hypothesis or the selected crowd sourced hypothesis. The information can include the weights associated with the selected hypothesis. Since the USS 182 provided the selected hypothesis, the USS 182 can identify the weights associated with the selected hypothesis.

Also, the information that the UE 104 sends to the USS 182 can include a device identifier of the UE 104. In an aspect, the device identifier may be a random identifier so that the provided information cannot be directly traced to the UE 104. The random identifier can be generated by the UE 104 or can be selected from a group of device identifiers that are stored on the UE 104. Additionally, the information that the UE 104 sends can include a time identifier which indicates a time period that the USS 182 can store or archive the information from the UE 104. The USS 182 can use the received information for crowd sourcing.

Additionally, the information that the UE 104 sends to the USS 182 can include a modem algorithm identifier. The modem algorithm identifier can be used to identify the version of the set of hypotheses 406 that are stored on the UE 104. Further, the information that the UE 104 sends can include information requesting specific approaches amongst the set of hypotheses 406 stored on the UE 104. For example, if the modem 402 has limited processing capability, the UE 104 may want to only use linear regression hypotheses as opposed to a more processor-intensive hypothesis. For example, the UE 104 can send identification of a subset of hypotheses, e.g., linear regression hypotheses, that the UE 104 can use. The identification of the subset of hypotheses can limit the hypotheses that the USS 182 can select. The subset of hypotheses contains less hypotheses than the set of hypotheses 406.

The USS 182 receives the information from the UE 104. The USS 182 stores or archives the received information. The USS 182 runs one or more learning algorithms 410 to select hypotheses and weights for the UE 104. The one or more learning algorithms 410 can be unsupervised learning algorithms. The unsupervised learning algorithms can be known algorithms, such as, liner regression, logistic regression, SVM, etc. For metrics and state information that is received from the UE 104 employing a selected unit sourced hypothesis, the USS 182 runs one or more learning algorithms 410 to cluster the information, e.g., known k-means unsupervised learning algorithm, and select a unit sourced hypothesis and associated weights for the corresponding modem function. The one or more learning algorithms 410 can use information from the UE that performed the same modem function using the same selected unit sourced hypothesis and/or one or more different selected unit sourced hypotheses.

If the received information includes metrics, but not state information, from a UE 104 that employed a selected unit sourced hypothesis, the USS 182 can run the one or more learning algorithms 410 using crowd sourced information to cluster the information and select a unit sourced hypothesis and associated weights. The crowd sourced information can be obtained from a crowd sourcing server 184. The USS 182 can provide the output (e.g., state information) that is obtained from the crowd sourced information to the UE 104 which can serve as a trigger point. The crowd sourced information can be used to override information received from the UE 104.

If the received information from the UE 104 employing a selected crowd sourced hypothesis, the USS 182 can run the one or more learning algorithms 410 using crowd sourced information to cluster the information and select a crowd sourced hypothesis and associated weights. The crowd sourced information can be obtained from a crowd sourcing server 184.

The clustering can indicate good results and bad results. For example, a good result is closely correlated to a preferred cluster and a bad result is an anomaly that is not closely correlated to a preferred cluster. Classification can be applied on the clusters to employ anomaly detection based on falling out of the identified clusters. To prevent or minimize anomalies, the USS 182 can use an anomaly as a trigger point. For example, the USS 182 can send the classification information, e.g., y, to the UE 104. The trigger point (e.g., y) can be sent as state information which can supplement or replace state information on the UE 104. The sent state information can be used as a trigger point when the associated modem function is executed by the modem 402. In one implementation, for example, a benefit can be to allow for the modem algorithms 404 to be deployed, particularly where the relevant parameters and the relative association in terms of determining trigger points is not well understood prior to deployment of the UE 104. Thus, the parameters for the modem algorithms 404 can be tuned post deployment. This also allows for more parameters to be included making the hypotheses selection itself dynamic enabling a flexible algorithm definition.

After selecting a user sourced hypothesis and associated weights and selecting a crowd sourced hypothesis and associated weights, the USS 182 can send the selected hypotheses to the UE 104. The UE 104 can receive the selected hypotheses and selected weights and can apply them for meeting specific trigger conditions on the device. As a result, the modem 402 of the UE 104 can be tuned using unit sourcing so that the algorithms can be fine-tuned to cater to the experiences specific to UE 104. By fine-tuning the features or parameters of the modem functions, the behavior of the modem 402 is customized rather than using generalized parameters that are applicable to all UEs in all markets.

The USS 182 can use one or more of crowd sourcing, cloud computing, artificial neural networks and neural network processor unit (NPU) to process the received information to select the hypotheses and associated weights. Crowd sourcing in the practice of obtaining needed services, ideas, or content by soliciting contributions from a large group of people and especially from the online community rather than from traditional employees or suppliers. Crowd sourcing is typically employed in the cell phone industry to collect data from different devices in the market to detect patterns of failures and identifying optimizations both in the network and devices. Cloud computing is the practice of using a network of remote servers hosted on the Internet to store manage, and process data, rather than a local server or a personal computer. In machine learning and cognitive science, artificial neural networks (ANN) are a family of models inspired by biological neural networks (the central nervous systems of animals, in particular the brain (which are used to estimate or approximate functions that can depend on a large number of inputs and are generally unknown with one or more hidden layers for training purposes. A NPU, typically consists of a graphics processing unit (GPU), central processing unit (CPU) and a digital signal processor (DSP) used for neural network computing on cellular devices. Neural networks can be applied to enable the hypotheses if relevant. If hidden layers are required with neural network processing, the layers and associated weights are provided to the UE 104. The UE 104 can use this to apply a hypothesis for each layer.

Figure 5:
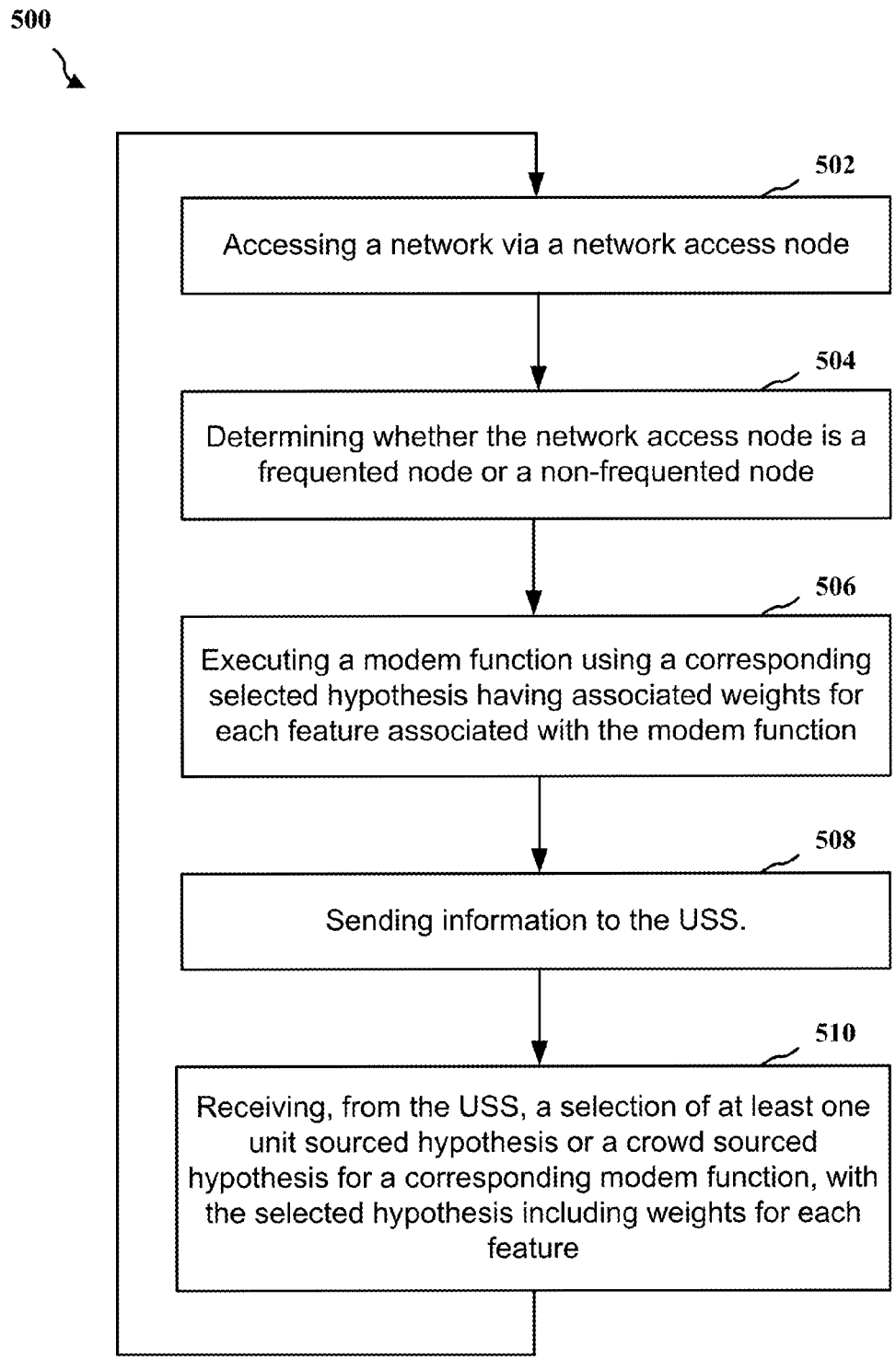
FIG. 5 is a flowchart of an aspect of a method of wireless communication performed on a user equipment to tune a modem according to one or more described aspects.
Figure 6:
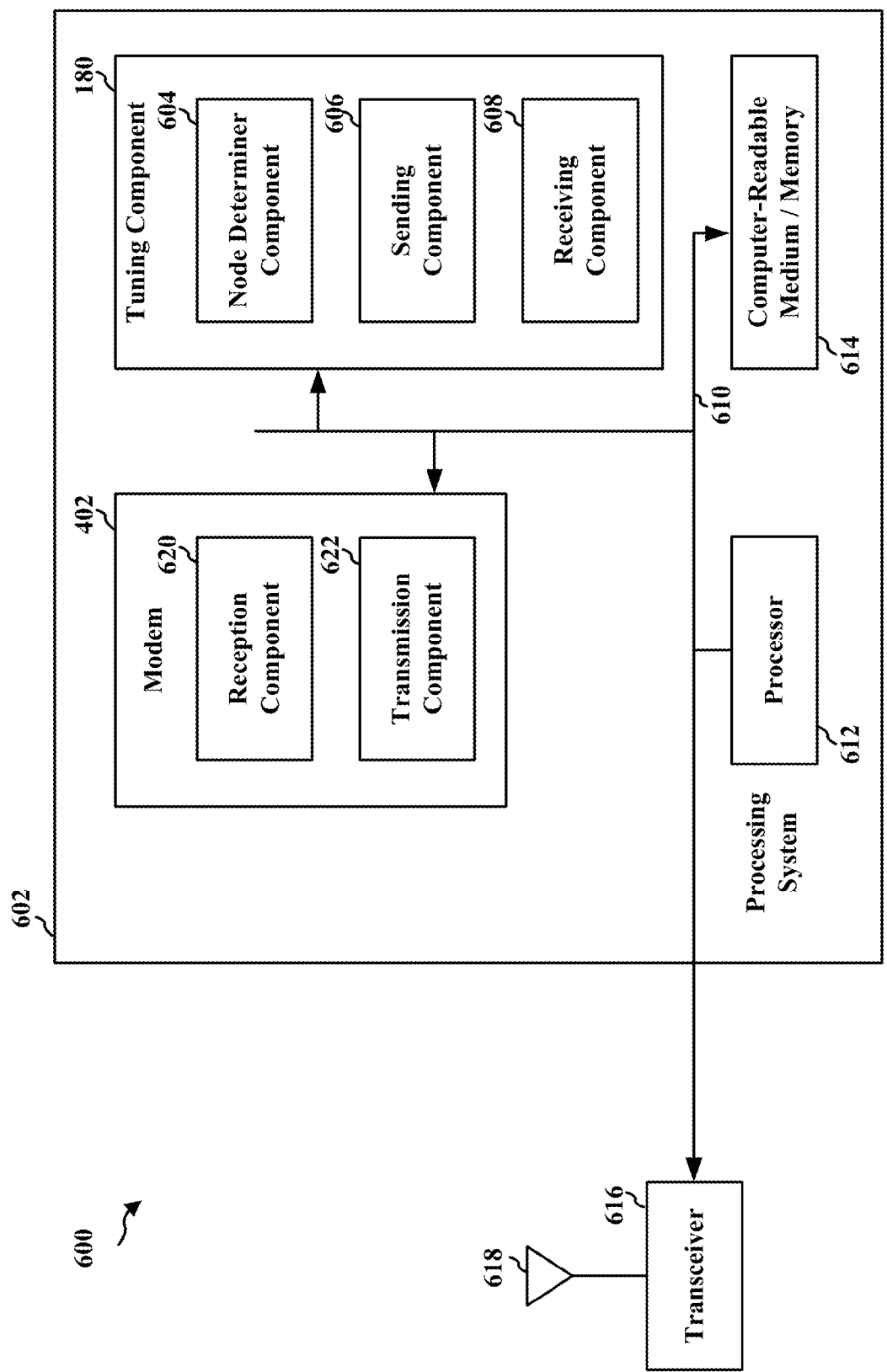
FIG. 6 is a diagram illustrating an example of a hardware implementation for a user equipment employing a processing system according to one or more described aspects.

Referring to FIGS. 5 and 6, an example aspect of a method 500 of wireless communication performed by a UE 104 to tune a modem 402 of the UE 104 and a hardware implementation for performing the method 500. For example, method 500 relates to the above-discussed implementations, and may be performed by the UE 104, such as the modem 402 and/or the tuning component 180.

At block 502, method 500 includes accessing a network via a network access node. For example, a modem 402 accesses a network, e.g. IP services 176, via a network access node, e.g., via a base station 102.

At block 504, method 500 includes determining whether the network access node is a frequented node or a non-frequented node. For example, a node determiner component 604 determines whether the network access node is a frequented node or a non-frequented node. A frequented node is a network access node that the UE 104 has previously accessed in a given time period and a non-frequented node is a network access node that the UE 104 has not previously accessed in the given time period. The given time period can be a pre-determined value such as, one week, two weeks or a month.

At block 506, method 500 includes executing a modem function using a corresponding selected hypothesis having associated weights for each feature associated with the modem function. For example, the modem 402, or the modem 402 in conjunction with the tuning component 180, executes a modem function using a selected hypothesis having associated weights for each feature associated with the modem function. The selected hypothesis is a unit sourced hypothesis if the network access node is determined to be a frequented node. The selected hypothesis is a crowd sourced hypothesis if the network node is determined to be a non-frequented access node. The selected hypothesis is one of a set of hypotheses 406 stored on the UE 104 with each hypothesis corresponding to a modem function and including a plurality of features and state information. Initially, when the UE 104 is deployed, the tuning component 180 can use a default hypothesis as the selected hypothesis. For example, the original equipment manufacturer can set the initial weights prior to deployment of the modem 402/UE 104.

At block 508, method 500 includes sending information, to the USS 182, the information comprising a device identifier, the modem function, the selected hypothesis and associated weights, metrics for each feature and state information, if available, in response to a trigger point being met when executing the modem function. For example, a sending component 606 sends, to the USS 182, a device identifier, the modem function, the selected hypothesis and associated weights, metrics for each feature and state information, if available, in response to a trigger point being met when executing the modem function. In one implementation, the sending component 606 sends a modem algorithm identifier which indicates a version of the set of hypotheses 406 stored on the UE 104. In one implementation, the sending component 606 sends a subset identifier to the USS 182 identifying a subset of hypotheses that the UE 104 can use.

At block 510, method 500 includes receiving, from the USS 182, a selection of at least one of a unit sourced hypothesis or a crowd sourced hypothesis for a corresponding modem function, with the selected hypothesis including weights for each feature. For example, a receiving component 608 receives, from the USS 182, a selection of at least one of a unit sourced hypothesis or a crowd sourced hypothesis for a corresponding modem function, with the selected hypothesis including weights for each feature. For example, the receiving component 608 can receive a selected unit sourced hypothesis, a selected crowd sourced hypothesis or both of a selected unit sourced hypothesis and a selected crowd sourced hypothesis. The selected unit sourced hypothesis can be based on information that the UE 104 sent to the USS 182, with the information being run through one or more learning algorithms 410 and the selected crowd sourced hypothesis based on crowd sourced data that was run through one or more learning algorithms 410.

FIG. 6 is a diagram 600 illustrating an example of a hardware implementation for an apparatus 600, e.g., UE 104, employing a processing system 602. The processing system 602 may be implemented with a bus architecture, represented generally by the bus 610. The bus 610 may include any number of interconnecting buses and bridges depending on the specific application of the processing system 602 and the overall design constraints. The bus 610 links together various circuits including one or more processors and/or hardware components, represented by the processor 612, the components 180, 402, 602, 604, 606, 608 and 610 and the computer-readable medium/memory 614. The bus 610 may also link various other circuits such as timing sources, peripherals, voltage regulators, and power management circuits, which are well known in the art, and therefore, will not be described any further.

The processing system 602 may be coupled to a transceiver 616. The transceiver 616 is coupled to one or more antennas 618. The transceiver 616 provides a means for communicating with various other apparatus, e.g., the USS 182 over a transmission medium. The transceiver 616 receives a signal from the one or more antennas 618, extracts information from the received signal, and provides the extracted information to the processing system 602, specifically the reception component 620 of modem 402. In addition, the transceiver 616 receives information from the processing system 602, specifically the transmission component 622, and based on the received information, generates a signal to be applied to the one or more antennas 618. The processing system 602 includes a processor 612 coupled to a computer-readable medium/memory 614. The processor 612 is responsible for general processing, including the execution of software stored on the computer-readable medium/memory 614. The software, when executed by the processor 612, causes the processing system 602 to perform the various functions described supra for any particular apparatus. The computer-readable medium/memory 614 may also be used for storing data that is manipulated by the processor 612 when executing software. The processing system 602 further includes at least one of the components 180, 402, 602, 604, 606, 608 and 610. The components may be software components running in the processor 612, resident/stored in the computer readable medium/memory 614, one or more hardware components coupled to the processor 612, or some combination thereof.

The apparatus may include additional components that perform each of the actions described with respect to the aforementioned flowchart of FIG. 5 and/or the aspects of FIGS. 4-8. As such, each action described with reference to the aforementioned flowchart of FIG. 5 and/or the aspects of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7A:
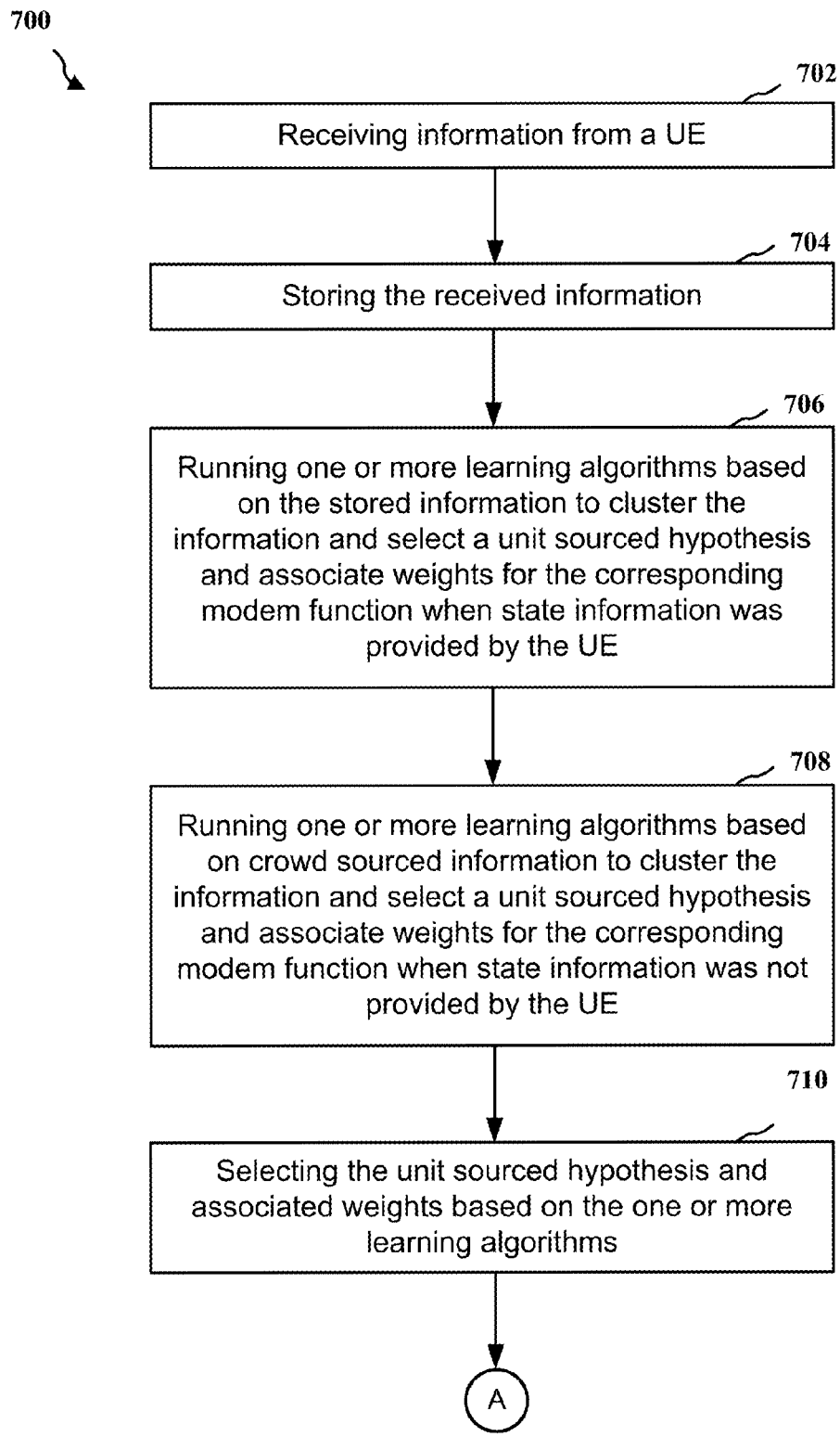
FIGS. 7A and 7B are a flowchart of an aspect of a method of wireless communication performed on a unit sourcing server to tune a modem according to one or more described aspects.
Figure 7B:
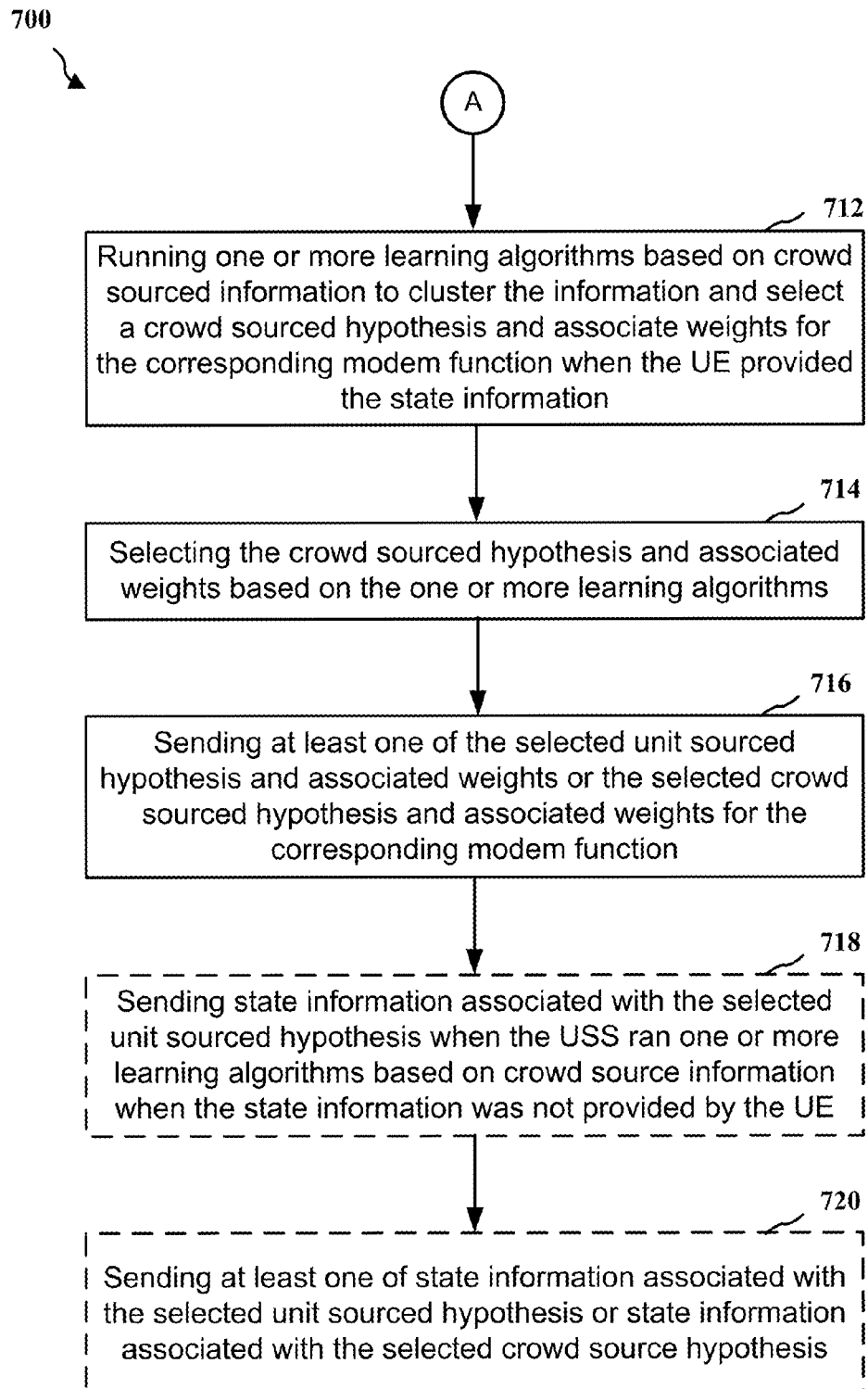
Figure 8:
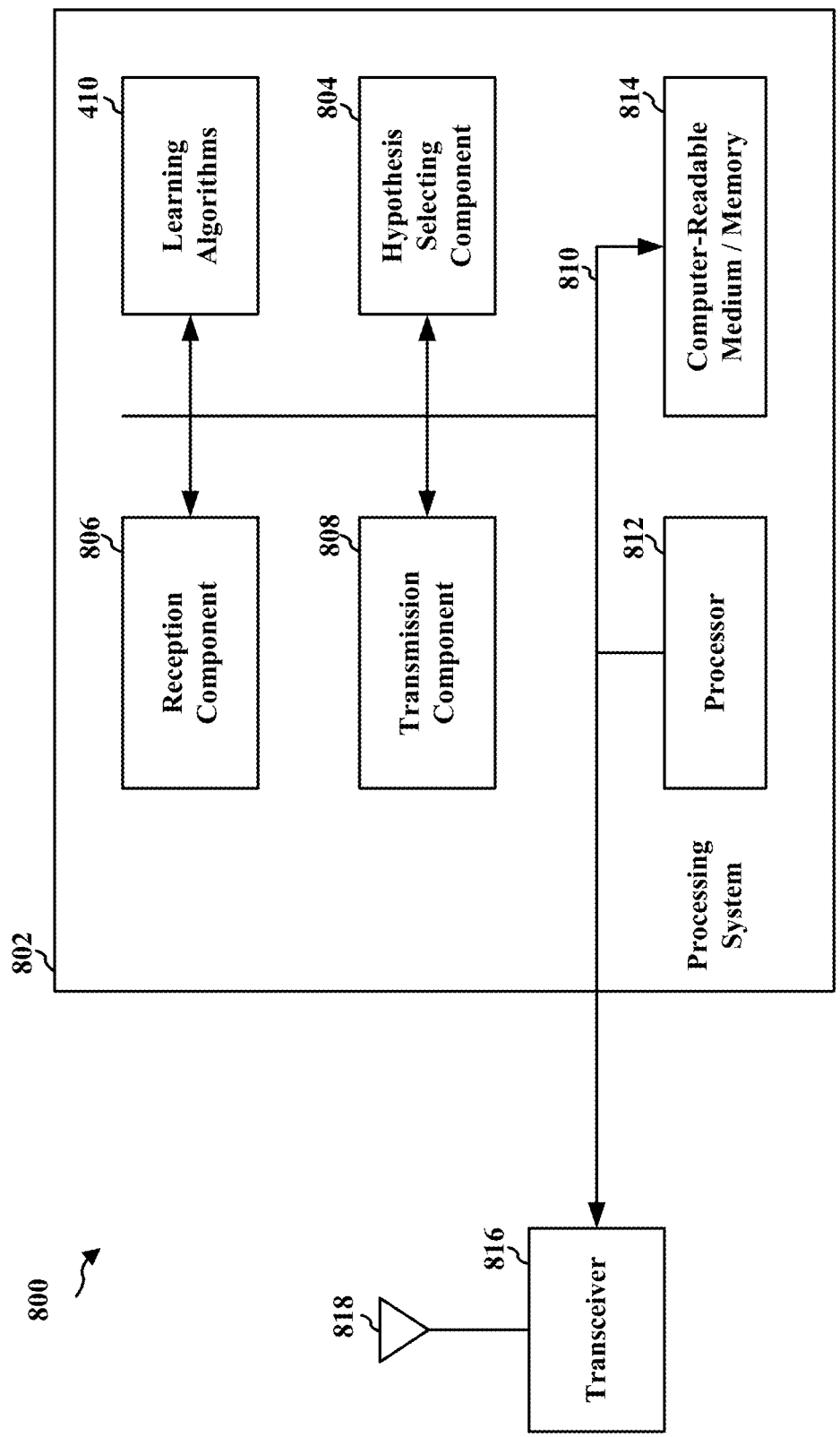
FIG. 8 is a diagram illustrating an example of a hardware implementation for a unit sourcing server employing a processing system according to one or more described aspects.

Referring to FIGS. 7A, 7B and 8, an example aspect of a method 700 of wireless communication performed by the USS 182 to tune the modem 402 of the UE 104 and a hardware implementation for performing the method 700. For example, method 700 relates to the above-discussed implementations, and may be performed by the USS 182.

At block 702, method 700 includes receiving information from a UE. For example, accessing a network via a network access node. For example, the USS 182 receives the information from the UE 104 via a reception component 806. The information can include a device identifier, a modem function executed by the UE 104, a selected hypothesis and associated weights for the corresponding modem functions, metrics for each feature of the corresponding modem function and state information, if the state information is available. The information is sent in response to a trigger point associated with the modem function being met when the modem function is executed.

At block 704, method 700 includes storing the received information. For example, the USS 182 stores the received information on a UE basis using the device identifier. The information can be stored locally or remotely, e.g., on one or more servers communicatively coupled to the USS 182.

At block 706, method 700 includes running one or more learning algorithms based on the stored information to cluster the information and select a unit sources hypothesis and associated weights for the corresponding modem function when state information is provided by the UE. For example, the USS 182 runs the one or more learning algorithms 410 based on the stored information to cluster the information and select a unit sourced hypothesis and associated weights for the correspond modem function.

At block 708, method 700 includes running one or more learning algorithms based on the crowd sourced information to cluster the information and select a unit sourced hypothesis and associated weights for the corresponding modem function when state information was not provided by the UE. For example, the USS 182 runs the one or more learning algorithms 410 based on crowd sourced information to cluster the information and select a unit sourced hypothesis and associated weights for the correspond modem function. The crowd sourced information can be obtained from one or more crowd sourcing servers 184.

At block 710, method 700 includes selecting the unit sourced hypothesis and associated weights based on the one or more learning algorithms. For example, a hypothesis selecting component 804 can select the unit sourced hypothesis and associated weights based on the one or more learning algorithms 410. The received information can include a modem algorithm identifier which can identify the version of the set of hypotheses 406 stored on the UE 104. The received information can include a request for specific approaches amongst the set of hypotheses 406 stored on the UE 104. For example, if the modem 402 resides in a UE 104 that has limited processing capability, the UE 104 may want to only use linear regression hypotheses. The UE 104 can send a subset of hypotheses, e.g., linear regression hypotheses, that the UE 104 prefers to employ. Thus the received information can limit the hypotheses that the USS 182 can select.

At block 712, method 700 includes running one or more learning algorithms based on the crowd sourced information to cluster the information and select a crowd sourced hypothesis and associated weights for the corresponding modem function when the state information was provided by the UE. For example, the USS 182 runs the one or more learning algorithms 410 to cluster the information and select a crowd sourced hypothesis and associated weights for the correspond modem function when the state information was provided by the UE 104. The crowd sourced information can be obtained from one or more crowd sourcing servers 184.

At block 714, method 700 includes selecting the crowd sourced hypothesis and associated weights based on the one or more learning algorithms. For example, a hypothesis selecting component 804 can select the crowd sourced hypothesis and associated weights based on the one or more learning algorithms.

At block 716, method 700 includes sending at least one of the selected unit sourced hypothesis and associated weights or selected crowd sourced hypothesis and associated weights for the corresponding modem function. For example, the USS 182 sends at least one of the selected hypotheses and associated weights using the transmission component 808. In another example, the USS 182 sends the at least one selected unit source hypothesis and associated weights or the selected crowd source hypothesis and associated weights using the transmission component 808. For example, the transmission component 808 can send a selected unit sourced hypothesis, a selected crowd sourced hypothesis or both of a selected unit sourced hypothesis and a selected crowd sourced hypothesis.

At block 718, method 700 can optionally include sending state information associated with the selected unit sourced hypothesis when the USS 182 ran one or more learning algorithms 410 based on crowd source information when the state information was not provided by the UE 104. For example, the USS 182 sends the state information using the transmission component 808. The state information can be used to supplement or replace state information on the UE 104. The sent state information can be used as a trigger point when the associated modem function is executed by the modem 402.

At block 720, method 700 can optionally include sending at least one of state information associated with the selected unit sourced hypothesis or state information associated with the selected crowd sourced hypothesis. For example, the USS 182 sends the state information using the transmission component 808. The state information can be used to supplement or replace state information on the UE 104. The sent state information can be used as a trigger point when the associated modem function is executed by the modem 402.

FIG. 8 is a diagram 800 illustrating an example of a hardware implementation for an apparatus 800, e.g., a USS 182, employing a processing system 802. The processing system 802 may be implemented with a bus architecture, represented generally by the bus 810. The bus 810 may include any number of interconnecting buses and bridges depending on the specific application of the processing system 802 and the overall design constraints. The bus 810 links together various circuits including one or more processors and/or hardware components, represented by the processor 812, the components 410, 804, 806 and 808 and the computer-readable medium/memory 814. The bus 810 may also link various other circuits such as timing sources, peripherals, voltage regulators, and power management circuits, which are well known in the art, and therefore, will not be described any further.

The processing system 802 may be coupled to a transceiver 816. The transceiver 816 is coupled to one or more antennas 818. The transceiver 816 provides a means for communicating with various other apparatus over a transmission medium. The transceiver 816 receives a signal from the one or more antennas 818, extracts information from the received signal, and provides the extracted information to the processing system 802, specifically the reception component 806. In addition, the transceiver 816 receives information from the processing system 802, specifically the transmission component 808, and based on the received information, generates a signal to be applied to the one or more antennas 818. The processing system 802 includes a processor 812 coupled to a computer-readable medium/memory 814. The processor 812 is responsible for general processing, including the execution of software stored on the computer-readable medium/memory 814. The software, when executed by the processor 812, causes the processing system 802 to perform the various functions described supra for any particular apparatus. The computer-readable medium/memory 814 may also be used for storing data that is manipulated by the processor 812 when executing software. The processing system 802 further includes at least one of the components 410, 804, 806 and 808. The components may be software components running in the processor 812, resident/stored in the computer readable medium/memory 814, one or more hardware components coupled to the processor 812, or some combination thereof.

The apparatus may include additional components that perform each of the actions described with respect to the aforementioned flowchart of FIGS. 7A and 7B and/or the aspects of FIGS. 4-8. As such, each action described with reference to the aforementioned flowchart of FIGS. 7A and 7B and/or the aspects of FIGS. 4-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As discussed earlier, neural networks can be used to assist a hypothesis to handle hidden layers and apply different techniques for the representations for each layer or regression. Neural networks allows for a computationally less intensive approach to implement a non-linear realization. The real time computations can be triggered based on the specific metrics changing beyond a specific delta value and the optimization of reducing or minimizing the computations can be tuned accordingly. The delta can be tuned on a per metric basis and can include a range of operations for that metric. For example, for a LTE-WiFi handover modem hypothesis, the RSSI delta value at a higher level, such as −50 dBM, will be different from the RSSI delta value used when the RSSI is at −85 dBm. The training of the neural networks can be done in the USS 182 and provide a means to ensure consistency. For example, one mechanism can apply a threshold level to determine the RTP error rate. In such a scenario, the RTP error rate can be a "1" when the RTP error rate is above a threshold level (e.g., 3%) and can be a "0" when the RTP error rate is below a threshold level (e.g., 3%). In another example, a second mechanism can apply an objective Means Opinion Score (MOS) prediction software to threshold the RTP error rate. In such a scenario, the MOS prediction software can generate a threshold of 3.2% with a "1" being outputted for an RTP error rate above the 3.2% threshold and a "0" being outputted for an TRP error rate below the 3.2% threshold.

Figure 9:
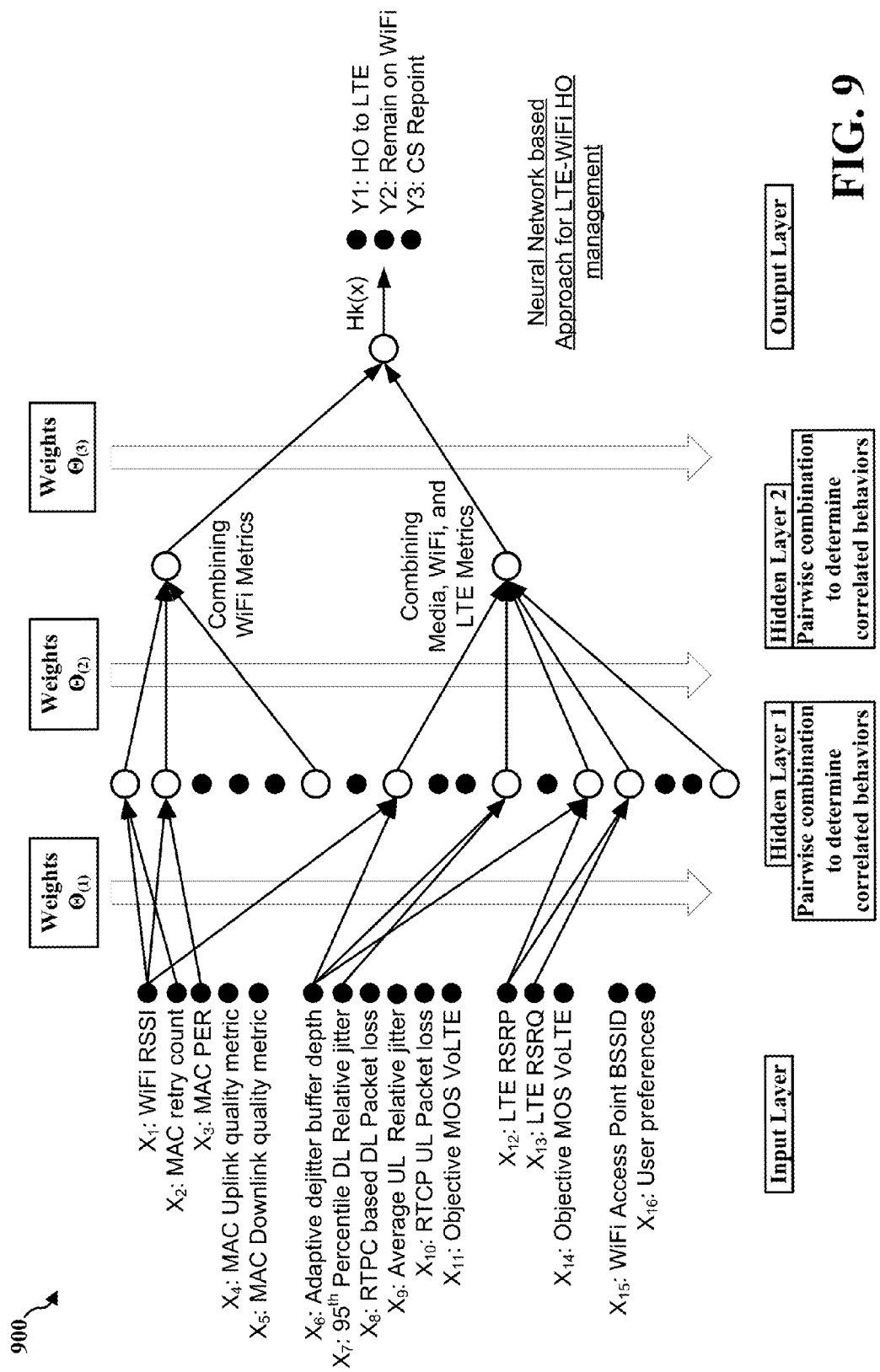
FIG. 9 is a diagram illustrating a Neural Network based approach for LTE-WiFi handover management according to one or more described aspects.

FIG. 9 is a diagram 900 illustrating a Neural Network based approach for LTE-WiFi handover management. As shown, the input layer contains metrics for features for LTE-WiFi handover. The metrics can be paired to determine correlated behaviors, For example, as shown, the parameters from the UE 104 are shown as an input layer with the weights ($\Theta_{(1)}$) as a first layer, the correlated parameters as hidden layer 1, the weights ($\Theta_{(2)}$) as a second layer, the combination of correlated parameters as hidden layer 2, the ($\Theta_{(3)}$) as a third layer and an output layer $h_\Theta(x)$ having three state values: Y1: handover to LTE, Y2: remain on WiFi and Y3: circuit switch repoint. As shown, the WiFi RSSI and MAC retry count are correlated, WiFi RSSI and MAC PER are correlated, WiFi RSSI and adaptive dejitter buffer depth are correlated, adaptive dejitter buffer depth and 95th percentile DL relative jitter are correlated, adaptive dejitter buffer depth and LTE RSRP are correlated, and LTE RSRP and LTE RSRQ are correlated. The pairwise group in the hidden layer 1 allow for correlation across any two metrics to be captured. The hidden layer 2 allows for MAC layer specific metrics base computation to be executed and the same computations can be made available to other application. As shown, the pairwise combinations can be correlated by combining WiFi metrics and by combining media, WiFi and LTE metrics. Based on the combinations, one or more state information can be determined as expected outputs, e.g., ground truth, which allow for learning the behavior for a given device and also lean on patterns seen through the crowd sourced data.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communications, comprising:
   accessing a wireless network via a network access node;
   determining whether the network access node is a frequented node or a non-frequented node based on an identifier for the network access node;
   executing a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and
   sending information, to a server, the information comprising a device identifier identifying the UE, the modem function, the selected hypothesis and associated weights, metrics for each feature and state information, if the state information is available, in response to a trigger point being met when executing the modem function.

2. The method of claim 1, wherein each hypothesis is one of linear regression, support vector machine and logistic regression.

3. The method of claim 2, wherein the selected hypothesis includes associated neural networks information for applying the hypothesis.

4. The method of claim 1, further comprising sending, to the server, a modem algorithm identifier identifying a version of the set of hypotheses stored on the UE.

5. The method of claim 1, further comprising sending, to the server, a subset of hypotheses that the UE can use wherein the subset contains less hypotheses than the set of hypotheses stored on the UE.

6. The method of claim 1, further comprising receiving, from the server, a selected unit sourced hypothesis and a selected crowd sourced hypothesis, with each selection corresponding to a modem function and including weights for each feature associated with the modem function, wherein the selected unit sourced hypothesis is based on information the UE sent to the server and the information being run through one or more learning algorithms and the selected crowd sourced hypothesis based on crowd sourced data.

7. The method of claim 6 wherein the one or more learning algorithms are unsupervised learning algorithms.

8. A method for wireless communications, comprising:
   receiving information, at a server from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function;
   storing, by the server, the received information;
   running, by the server, one or more learning algorithms based on the stored information to cluster the information and to select a unit sourced hypothesis and associated weights for the corresponding modem function when the UE provided the state information;
   running, by the server, one or more learning algorithms based on crowd sourced information from other UEs to cluster the information and to select a unit sourced hypothesis and associated weights for the corresponding modem function when the state information was not provided by the UE;

selecting, by the server, the unit sourced hypothesis and associated weights based on the one or more learning algorithms;

running, by the server, one or more learning algorithms based on crowd sourced information from other UEs to cluster the information and to select a crowd sourced hypothesis and associated weights for the corresponding modem function when the UE provided the state information;

selecting, by the server, the crowd sourced hypothesis and associated weights based on the one or more learning algorithms; and sending, by the server to the UE, at least one of the selected unit sourced hypothesis and associated weights or the selected crowd sourced hypothesis and associated weights for the corresponding modem function.

9. The method of claim 8, wherein the received information further comprises weights associated with the selected hypothesis for the corresponding modem function.

10. The method of claim 8, further comprising, receiving by the server from the UE, a modem algorithm identifier indicating a version of a set of hypotheses stored on the UE and the selected unit sourced hypothesis and the selected unit sourced hypothesis are selected from the set of hypotheses stored on the UE.

11. The method of claim 8, further comprising receiving by the server from the UE, a subset of hypotheses that the UE can use and the and the selected unit sourced hypothesis and the selected unit sourced hypothesis are selected from the subset of hypotheses stored on the UE, where the subset is less than a set of hypotheses stored on the UE.

12. The method of claim 8, wherein each hypothesis is one of linear regression, support vector machine and logistic regression.

13. The method of claim 12, further comprising employing neural networks and sending neural networks information for applying a selected hypothesis.

14. The method of claim 8, wherein the one or more learning algorithms are unsupervised learning algorithms.

15. The method of claim 11, further comprising:

sending, by the server to the UE, state information associated with a selected unit sourced hypothesis when the server ran one or more learning algorithms based on crowd sourced information when the state information was not provided by the UE; and sending, by the server to the UE, at least one of state information associated with a selected unit sourced hypothesis and state information associated with a selected crowd sourced hypothesis.

16. An apparatus for wireless communication, comprising:

a transceiver;
a memory configured to store instructions; and
one or more processors communicatively coupled with the transceiver and the memory, wherein the one or more processors are configured to execute instructions to:
access a wireless network via a network access node;
determine whether the network access node is a frequented node or a non-frequented node based on an identifier for the network access node;
execute a modem function using a corresponding selected hypothesis having associated weights for each feature associated with the modem function, the selected hypothesis being a unit sourced hypothesis if the network access node is determined to be a frequented node and the selected hypothesis being a crowd sourced hypothesis if the network access node is determined to be a non-frequented node, wherein the selected hypothesis is one of a set of hypotheses stored on the UE with each hypothesis corresponding to a modem function and including a plurality of features, state information and at least one trigger point; and
send information, to a server, the information comprising a device identifier identifying the UE, the modem function, the selected hypothesis and associated weights, metrics for each feature and state information, if the state information is available, in response to a trigger point being met when executing the modem function.

17. The apparatus of claim 16, wherein each hypothesis is one of linear regression, support vector machine and logistic regression.

18. The apparatus of claim 17, wherein the selected hypothesis includes associated neural networks information for applying the hypothesis.

19. The apparatus of claim 16, wherein the one or more processors are configured to execute instructions to send to the server, a modem algorithm identifier identifying a version of the set of hypotheses stored on the UE.

20. The apparatus of claim 16, wherein a frequented node is a network access node that has been accessed within a given time period and a non-frequented node is a network access node that has not been accessed within the given time period.

21. The apparatus of claim 16, wherein the one or more processors are configured to execute instructions to receive, from the server, a selected unit sourced hypothesis and a selected crowd sourced hypothesis, with each selection corresponding to a modem function and including weights for each feature associated with the modem function, wherein the selected unit sourced hypothesis is based on information the UE sent to the server and the information being run through one or more learning algorithms and the selected crowd sourced hypothesis based on crowd sourced data.

22. The apparatus of claim 21, wherein the one or more learning algorithms are unsupervised learning algorithms.

23. A server for wireless communications, comprising:

a transceiver;
a memory configured to store instructions; and
one or more processors communicatively coupled with the transceiver and the memory, wherein the one or more processors are configured to execute instructions to:
receive information from a user equipment (UE), the information comprising a device identifier, a modem function executed by the UE, a selected hypothesis for the corresponding modem function, metrics for each feature associated with the corresponding modem function and state information, if the state information is available, in response to a trigger point associated with the modem function being met when executing the modem function;
store the received information;
run one or more learning algorithms based on the stored information to cluster the information and to select a unit sourced hypothesis and associated weights for the corresponding modem function when the UE provided the state information;

run one or more learning algorithms based on crowd sourced information from other UEs to cluster the information and to select a unit sourced hypothesis and associated weights for the corresponding modem function when the state information was not provided by the UE;

select the unit sourced hypothesis and associated weights based on the one or more learning algorithms;

run one or more learning algorithms based on crowd sourced information from other UEs to cluster the information and to select a crowd sourced hypothesis and associated weights for the corresponding modem function when the UE provided the state information;

select the crowd sourced hypothesis and associated weights based on the one or more learning algorithms; and send, to the UE, at least one of the selected unit sourced hypothesis and associated weights or the selected crowd sourced hypothesis and associated weights for the corresponding modem function.

24. The server of claim 23, wherein the received information further comprises weights associated with the selected hypothesis for the corresponding modem function.

25. The server of claim 24, wherein the one or more processors are configured to execute instructions to receive, from the UE, a modem algorithm identifier indicating a version of a set of hypotheses stored on the UE and the selected unit sourced hypothesis and the selected unit sourced hypothesis are selected from the set of hypotheses stored on the UE.

26. The server of claim 24, wherein the one or more processors are configured to execute instructions to receive, from the UE, a subset of hypotheses that the UE can use and the and the selected unit sourced hypothesis and the selected unit sourced hypothesis are selected from the subset of hypotheses stored on the UE, where the subset is less than a set of hypotheses stored on the UE.

27. The server of claim 24, wherein each hypothesis is one of linear regression, support vector machine and logistic regression.

28. The server of claim 27, wherein the one or more processors are configured to execute instructions to employ neural networks and send neural networks information for applying a selected hypothesis.

29. The server of claim 23, wherein the one or more processors are configured to execute instructions to send, to the UE, state information associated with a selected unit sourced hypothesis when the server ran one or more learning algorithms based on crowd sourced information when the state information was not provided by the UE.

30. The server of claim 23, wherein the one or more processors are configured to execute instructions to send, to the UE, at least one of state information associated with a selected unit sourced hypothesis and state information associated with a selected crowd sourced hypothesis.

* * * * *